United States Patent [19]

James

[11] 4,165,177
[45] Aug. 21, 1979

[54] REAR PROJECTION MICROFILM READER/PRINTER

[76] Inventor: Paul M. James, 27, Portland Rd., London W.11., England

[21] Appl. No.: 825,835

[22] Filed: Aug. 18, 1977

Related U.S. Application Data

[63] Continuation of Ser. No. 665,451, Mar. 10, 1976, abandoned.

[30] Foreign Application Priority Data

Mar. 12, 1975 [GB] United Kingdom ............... 10231/75

[51] Int. Cl.² ............................................. G03B 27/16
[52] U.S. Cl. .................... 355/45; 353/26 R; 353/78
[58] Field of Search ............... 353/26, 27, 71, 77, 353/78; 355/5, 40, 43, 45

[56] References Cited

U.S. PATENT DOCUMENTS

| | | |
|---|---|---|
| 2,493,998 | 1/1950 | Pratt et al. ............................. 355/45 |
| 3,240,115 | 3/1966 | Robbins et al. ........................ 355/45 |
| 3,547,534 | 12/1970 | Akiyama et al. ...................... 355/45 |
| 3,899,248 | 8/1975 | Tiger ..................................... 355/5 |

FOREIGN PATENT DOCUMENTS 595718  9/1957  Italy ............................................. 355/5

Primary Examiner—Richard E. Aegerter
Assistant Examiner—John W. Shepperd
Attorney, Agent, or Firm—John W. Logan, Jr.

[57] ABSTRACT

This invention relates to a microfilm reader/printer having a back-projection viewing screen, a printing station having a printing plane and a movable reflecting member adapted to reflect a microfilm image onto the printing plane when the member is in a printing position and onto the screen when the member is in a reading position, said moving member having reflecting surfaces on opposite sides thereof one of which is used in the reading position and the other of which is used in the printing position.

3 Claims, 1 Drawing Figure

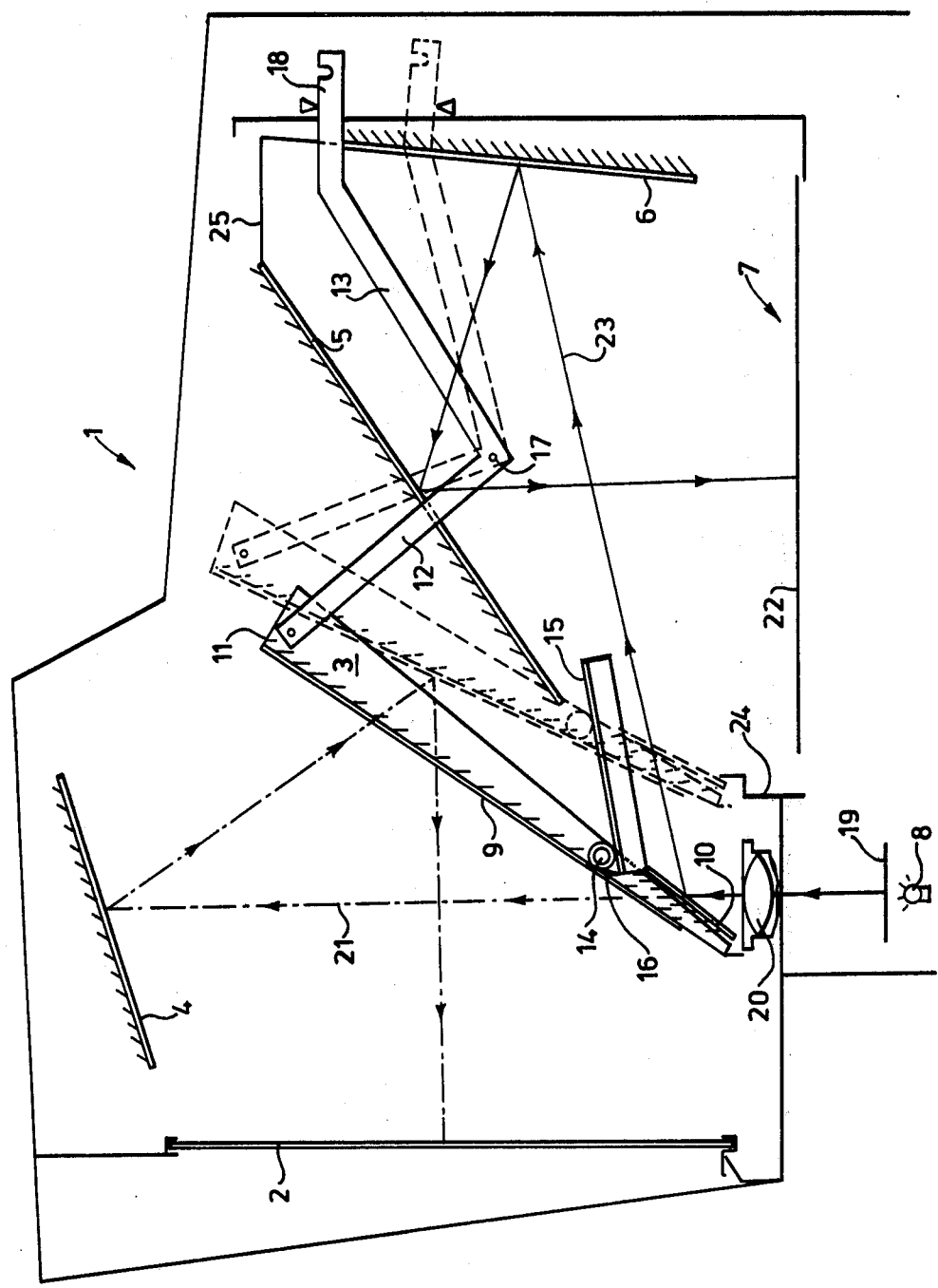

REAR PROJECTION MICROFILM READER/PRINTER

This is a continuation of application Ser. No. 665,451, filed Mar. 10, 1976, now abandoned.

The present invention relates to a rear projection microfilm reader/printer.

Conventionally a microfilm reader/printer comprises a support for a microfilm input (which may be aperture cards, microfiche, jackets or roll film), a light source, a translucent viewing screen on which an enlarged image of the input material may be projected, and a printing station in which a permanent record of an image can be produced when required. To effect the change in direction of the image of the input material from the screen to the printing station it is known to use a mirror means which is movable between "reading" and "printing" positions, and this invention concerns a reader/printer of this kind and has particular reference to an improved arrangement of the movable mirror means.

According to the present invention a microfilm reader/printer comprises a translucent viewing screen, a printing station having a printing plane, a moving member having two reflecting surfaces adapted, respectively, to reflect light in opposed directions away from the moving member, means for supporting the moving member in a printing position and in a reading position, means for moving said member between the reading position and the printing position, a light source holder, and a support for a microfilm input whereby light from a light source held in said holder is transmitted to said viewing screen via at least two reflecting surfaces, one of which comprises one of said reflecting surfaces of said moving member when the latter is in its reading position, and is transmitted to said printing plane via at least two reflecting surfaces, one of which comprises the other of said reflecting surfaces of said moving member when the latter is in its printing position.

Suitably the printing plane of the reader/printer is housed in a compartment of the reader/printer which is substantially a light-tight box closed at the side confronting the screen by said moving member when the latter is in its viewing position so as to obstruct the passage of light through said screen to the printing plane.

Conveniently light from said light source holder is transmitted to said screen via two reflecting surfaces and is transmitted to said printing plane via three reflecting surfaces. Typically the printing plane is disposed substantially horizontally.

Conveniently the means for supporting the moving member comprises a bell-crank lever pivotally connected adjacent to one end of said member and sliding or rolling means connected adjacent the other end of said member and supported in guide means, typically inclined at an angle to the horizontal.

The invention will now be further described, by way of example, with reference to the accompanying drawing, the sole FIGURE of which shows a schematic side view of a microfilm reader/printer according to the present invention.

The drawing shows a rear projection microfilm reader/printer, having a casing generally designated by the reference numeral 1, and comprising a translucent viewing screen 2, a moving member 3, fixed mirrors 4, 5 and 6, a printing station, generally shown at 7, and a light source 8 held in a holder (not shown).

The member 3, which is provided with reflecting surfaces 9, 10 on opposed sides thereof for reflecting light in opposed directions away from the moving member 3, is pivotally linked at 11, at its upper end, to one arm 12 of a bell-crank lever 13. Rollers 14 (only one of which can be seen in the drawing) are fixed to the member 3 intermediate its ends, but closer to the lower end, and are supported on an inclined guide 15 having a stop 16 at its lower end. The bell-crank lever 13 is turnable about an axis 17 between two rest positions for effecting a combined translation and rotation of the moving member 3 between a printing position and a reading position. (The position of the lever 13 and the member 3, when the member 3 is in its printing position are shown in full lines in the drawing, and the positions of the lever 13 and the member 3, when the member 3 is in its reading position, are shown in dashed lines in the drawing). A moving mechanism for turning the bell-crank lever 13 about its axis 17 is not shown but may conveniently comprise a mechanism including a Bowden cable the inner wire of which is connected to the free end of an arm 18 of the lever 13.

In order to project an image from a microfilm input 19 on to the screen 2, it is necessary for the moving member 3 to be positioned in its reading position and the microfilm input 19 to be supported in a support (not shown) above the light source 8.

Light passing through the microfilm input 19 is then projected through a lens 20 and, via the fixed mirror 4 and the reflecting surface 9, onto the rear surface of the screen 2 along a path 21. The enlarged image projected on to the screen may be focused by adjusting the vertical position of the lens 20 and suitable adjustment means are provided (not shown) accessible from outside the casing 1.

In order to print a permanent record of the microfilm input 19, the moving member 3 is positioned in its printing position and a photo-sensitive sheet (e.g. chemically or electrostatically sensitised) is conveyed to the horizontal printing plane 22 in the printing station 7. The image of the microfilm input 19 is then relected, via the reflecting surface 10 and the mirrors 6 and 5, along a path 23 on to the photo-sensitive sheet.

After exposure for a predetermined period, the latent image formed on the sheet is subsequently developed in the printing station 7 to produce the desired permanent record. The procedure for producing the permanent record is not a feature of this invention and will not be described further herein.

It should be realised that the printing plane 22 is housed in a compartment of the casing 1 which is substantially a light-tight box closed at the side confronting the viewing screen 2 by the moving member 3 which obstructs passage of light through the screen to the printing plane 22. Shields 24 and 25 define parts of the light-tight box and obstruct the passage of unwanted light to the printing plane 22.

In another embodiment of the invention (not shown) the mirror 5 of the microfilm reader/printer is also mounted on the movable member 3, so that it only occupies the position required for use in defining the path 23 when the member 3 is in the printing position. This is satisfactory however since the mirror 5 is only utilised in the printing mode of operation of the reader/printer.

From the drawing it will be noted that the lens 20 is not obstructed by the member 3 when the latter is in its reading position and this means that merely by making the screen 2 removable from the casing 1, the lens can be easily changed (to modify the degree of enlargement of the projected/printed image) merely by lifting out one lens 20 and substituting it by another.

The reader/printer would normally be associated with a logic control circuit which had a normal mode that has the member 3 in the reading position. When the user wishes to obtain a permanent record of an image viewed, a "print" button can be pressed wherein the logic of the machine automatically turns off the light source 8, moves the member 3 temporarily into the printing position, supplies a sensitised sheet to the printing plane 22, exposes that sheet for the preset period and then commences the development of the exposed sheet as the member 3 returns to its reading position. As soon as the member 3 is back in the dotted line position shown in the drawing, the light-tight compartment is reclosed and the source 8 can be turned on again to allow further scanning of the microfilm input 19 by the user.

The stop 16 can be positioned to control the printing position of the member 3 and the extent to which the arm 18 is depressed by the moving mechanism (e.g. the Bowden cable) can be used to set the viewing position. This means that the precise positioning of only one of the two rest positions need be set by the moving mechanism employed. Alternatively, the stop 16 can be dispensed with and each end position of the moving member 3 can be set by adjustable stops controlling the movement of the arm 18.

The extent of movement of the member 3 between the "reading" and "printing" positions is small in the design of reader/printer described and this has the advantage of allowing faster overall print out times to be achieved.

What is claimed is:

1. A microfilm reader/printer comprising a housing, a translucent viewing screen forming part of the housing, a printing station within the housing having a horizontal printing plane, a first fixed reflecting surface, a moving member having two reflecting surfaces on opposite sides of said member, said surfaces reflecting light in opposite directions away from the moving member, means for supporting the moving member in a printing position and in a reading position and for moving said member between the reading position and the printing position, a substantially light-tight compartment within the housing having an opening thereto confronting said screen, said moving member obstructing the direct passage of daylight from said viewing screen to said opening and said printing plane when said moving member is in any position, said printing plane being located in said light-tight compartment, second and third fixed reflecting surface within said compartment, a light source, and a support for a microfilm input; whereby light from the light source is transmitted to said viewing screen via said first fixed reflecting surface and one of said reflecting surfaces of said moving member when the latter is in its reading position, and is transmitted to said printing plane via said second and third fixed reflecting surfaces in said compartment and the other of said reflecting surfaces of said moving member when the latter is in its printing position, said means for supporting and moving said moving member comprising a pivot and a mechanism attached to said member by said pivot to effect a combined translation and rotation of the moving member as the said means is actuated.

2. A microfilm reader/printer comprising a housing, a translucent viewing screen forming part of the housing, a printing station within the housing having a printing plane, a moving member having two reflecting surfaces on opposite sides of said member, said reflecting surfaces being adapted, respectively, to reflect light in opposite directions away from the moving member, means for moving the moving member between a printing position and a reading position, a light source and a support for a microfilm input, a first fixed reflecting surface arranged such that light from the light source is transmitted to said viewing screen via said first fixed reflecting surface and one of said reflecting surfaces when the moving member is in its reading position and is transmitted toward said printing plane when said moving member is in its printing position, said means for moving said moving member comprising a bell-crank lever, first pivot means connecting said lever adjacent one of its ends to one end of said member and second pivot means connecting said lever to said housing and roller means connected adjacent the other end of said member, guide means in said housing for guiding movement of said roller means whereby combined translation and rotation of said moving member is effected.

3. A microfilm reader/printer comprising a housing, a translucent viewing screen forming part of the housing, a printing station within the housing having a horizontal printing plane, a first fixed reflecting surface, a moving member having two reflecting surfaces on opposite sides of said member, said surfaces reflecting light in opposite directions away from the moving member, means for supporting the moving member in a printing position and in a reading position and for moving said member between the reading position and the printing position, a substantially light-tight compartment within the housing having an opening thereto confronting said screen, said moving member obstructing the direct passage of daylight from said viewing screen to said opening and said printing plane when said moving member is in any position, said printing plane being located in said light-tight compartment, second and third fixed reflecting surfaces within said compartment, a light source, and a support for a microfilm input; whereby light from the light source is transmitted to said viewing screen via said first fixed reflecting surface and one of said reflecting surfaces of said moving member when the latter is in its reading position, and is transmitted to said printing plane via said second and third fixed reflecting surfaces in said compartment and the other of said reflecting surfaces of said moving member when the latter is in its printing position, said means for supporting and moving said moving member comprising a bell crank lever, first pivot means supporting said lever in the housing and second pivot means pivotally supporting one end of said member from said lever, roller means connected adjacent the other end of said member and guide means mounted in the housing along which the roller means moves as said member moves between printing and reading positions.

* * * * *